(12) United States Patent
Chaix et al.

(10) Patent No.: US 8,496,209 B2
(45) Date of Patent: Jul. 30, 2013

(54) DEVICE FOR DEPLOYING AND AIMING STRUCTURAL ELEMENTS IN A SPACE ENVIRONMENT

(75) Inventors: Rodolphe Chaix, Cuers (FR); Christian Daval, Saint Cezaire sur Siagne (FR)

(73) Assignee: Thales, Neuilly/sur/Seine (FR)

( * ) Notice: Subject to any disclaimer, the term of this patent is extended or adjusted under 35 U.S.C. 154(b) by 258 days.

(21) Appl. No.: 12/970,520

(22) Filed: Dec. 16, 2010

(65) Prior Publication Data
US 2011/0147532 A1 Jun. 23, 2011

(30) Foreign Application Priority Data
Dec. 18, 2009 (FR) .................................. 09 06177

(51) Int. Cl.
*B64G 1/44* (2006.01)
*B64G 1/22* (2006.01)

(52) U.S. Cl.
USPC .................................... 244/172.6; 244/172.7

(58) Field of Classification Search
USPC .............. 244/172.6, 172.7; 136/245, 292
See application file for complete search history.

(56) References Cited

U.S. PATENT DOCUMENTS

| 3,525,483 | A | * | 8/1970 | Van Alstyne | 244/172.6 |
| 3,733,758 | A | | 5/1973 | Maier et al. | |
| 4,148,163 | A | | 4/1979 | Chenin et al. | |
| 5,319,905 | A | * | 6/1994 | Szirtes | 52/108 |
| 5,620,529 | A | | 4/1997 | Bassily et al. | |
| 5,833,176 | A | | 11/1998 | Rubin et al. | |
| 6,008,447 | A | * | 12/1999 | Meurer et al. | 136/245 |
| 6,682,020 | B2 | * | 1/2004 | Janson | 244/172.6 |
| 6,983,914 | B2 | * | 1/2006 | Stribling et al. | 244/172.8 |
| 7,942,185 | B2 | * | 5/2011 | Long | 160/213 |
| 8,061,660 | B2 | * | 11/2011 | Beidleman et al. | 244/172.7 |

FOREIGN PATENT DOCUMENTS

| FR | 2088280 | 1/1972 |
| FR | 2354925 | 1/1978 |

* cited by examiner

*Primary Examiner* — Tien Dinh
(74) *Attorney, Agent, or Firm* — Baker & Hostetler LLP (57) ABSTRACT

A device for deploying and aiming structural elements designed to be placed in Earth includes at least one locking/unlocking device making it possible to deactivate the first coupling mode and to activate a second coupling mode allowing a portion of the device to be aimed at a target. The device uses: a plurality of structural elements linked together by articulations, the assembly forming an articulated arm linked to a payload via a root section; the articulations having at least one pivoting connection making it possible to have two consecutive structural elements pivot relative to one another; a motor making it possible to activate at least one pivoting connection of an articulation; and a system for coupling the articulations making it possible to link the pivoting of all of the structural elements comprising a first coupling mode.

14 Claims, 7 Drawing Sheets

DEVICE FOR DEPLOYING AND AIMING STRUCTURAL ELEMENTS IN A SPACE ENVIRONMENT

CROSS-REFERENCE TO RELATED APPLICATION

This application claims priority to foreign French patent application No. FR 0906177, filed on Dec. 18, 2009, the disclosure of which is incorporated by reference in its entirety.

TECHNICAL FIELD

The present invention relates to the field of articulated devices designed to be placed on a payload placed in Earth orbit. More particularly, the invention relates to the field of satellites comprising structures to be deployed such as solar generators. Finally the invention relates to devices having two life phases in which the first phase comprises the deployment of structural elements in space and in which the second life phase comprises the aiming of these elements at a target during the flight in orbit.

BACKGROUND

Currently, when satellites are placed in orbit around the Earth, they require a phase for the deployment of the structural elements carrying solar generators or antennas depending on the mission. This phase is particularly critical because the success of the mission depends on it.

The structural elements assembly is a structure which forms an articulated arm. Notably, amongst these structural elements there are yokes and/or solar panels and/or antennas. These elements are joined together by articulations from the root section to the end of the articulated arm.

In order to obtain a fully deployed posture of the structural elements and to minimize on the one hand the distribution of the motive force on the structural elements and on the other hand the kinematic interferences between the elements, it is often necessary to use a coupling system making it possible to coordinate and articulate the deployment of the structural elements in a uniform manner.

The initially-folded structure is deployed according to a movement sequence and at a determined speed. All the angles between two consecutive structural elements are opened according to a determined law by the coupling mechanism.

A known coupling system uses pulleys positioned on each of the articulations and cables connecting the pulleys making it possible to transfer the forces between the structural elements at the time of deployment.

In order to activate the first articulation which comprises a first pulley, a motor is usually situated at the root section, that is to say at the first articulation which joins together the payload of the satellite and the first structural element.

At the time of deployment, certain structures have, in addition to the coupling system, a system for locking the articulations together. The locking system makes it possible to immobilize the articulations and hence the couplings linked to the articulations for the rest of the mission of the satellite which will no longer need to deploy or retract these structural elements. The locking makes it possible to pass from a first life phase of the satellite corresponding to placement in orbit and deployment of its structural elements to a second life phase corresponding to the mission itself, in which the structural elements will have a specific mobility.

Once the structure is deployed, it may be necessary, throughout the lifetime of the satellite, to aim the structural elements at a target. In this second life phase, the deployment of the structure being completed, it is necessary, depending on the mission, to aim the structure in a direction of a target. For example, this may be the sun, if the structure comprises solar generators such as solar panels, or else a geographic region on the planet in the case of an antenna or else a precise point in space as required.

In order to protect the deployment phase, it is usually separated from the phase corresponding to the mission. Currently, the drive means used in each life phase are partitioned for security reasons. Notably, the motor which is used to articulate the structural elements for aiming at a target is different from the motor which is used to deploy the structure. The drive means are different depending on the life phase because the mechanisms of articulations with and without coupling of the two phases are different.

Usually, the pivoting connection of the root section is fixed after the deployment; it is said to be locked. In the prior art, there is at the root section of the payload, a pivoting connection making it possible to orient the whole of the deployed structure, the structure comprising all the attached structural elements when they are locked together.

One drawback of the solutions of the prior art is the space requirement and the weight of a second motor for aiming the deployed structure at a target.

A second drawback is that the locking system immobilizes the coupling of the articulations and locks the structure, the pulley mechanism making it possible to deploy the structural elements then no longer being used. The second motor then activates the articulations of the structure in order to cause all or some of it to pivot. This solution means that it is necessary to couple the locked coupling system with another system making it possible to rotate a portion of the structure so as to make it pivot towards a target.

One object of the invention is to alleviate the aforementioned drawbacks.

SUMMARY OF THE INVENTION

One object of the invention is to share the drive means in the two life phases. In particular, the invention proposes to define two modes of motor function of the coupling for each of the life phases. The invention comprises a locking/unlocking system making it possible to pass from a first coupling mode comprising a first law of articulation of the structure for the deployment to a second coupling mode comprising a second law of articulation of the structure for the aiming of the structure.

Advantageously, the device for deploying and aiming structural elements designed to be placed in Earth orbit comprises:
  a plurality of structural elements linked together by articulations, the assembly forming an articulated arm linked to a payload via a root section;
  the articulations comprising at least one pivoting connection making it possible to have two consecutive structural elements pivot relative to one another,
  the root section comprising a pivoting connection making it possible to have the first structural element pivot relative to the payload;
  a locking/unlocking system comprising at least one locking device placed on an articulation making it possible to lock at least one pivoting connection;

a coupling system comprising a first coupling mode allowing each of the structural elements to pivot according to a predefined law of rotation.

at least one motor making it possible to activate the coupling system, the said motor being positioned on an articulation, called a driving articulation.

Advantageously, the locking system makes it possible to deactivate the first coupling mode and to activate a second coupling mode, the second coupling mode making it possible to retain the unlocking of a pivoting connection of at least one articulation, called the aiming articulation, the rotation of the motor causing the rotation of the aiming articulation.

Advantageously, the coupling system comprises:
a plurality of pulleys linked by cables, one pulley of which is activated by the motor, called the driving pulley and;
means for attaching the pulleys to the structural elements, each of the articulations comprising at least two pulleys one of which is attached to an upstream structural element, called the upstream pulley, and the other is attached to a downstream structural element, called the downstream pulley, the root section comprising a pulley attached to the first structural element.

Advantageously, the locking/unlocking system comprises at least one device for locking/unlocking a coupling pulley relative to the articulation.

Advantageously, the articulation comprising the motor, and all the articulations situated between the articulation comprising the motor and the aiming articulation comprise a device for locking/unlocking a pulley, the aiming articulation comprising a device for locking/unlocking a pulley only on the downstream pulley.

Advantageously, all the articulations have a device for locking/unlocking a pivoting connection of an articulation except the aiming articulation.

Advantageously, the engagement of the second coupling mode causes:
a plurality of pivoting connections to be locked;
the pulleys of each articulation included between the articulation comprising the motor, called the driving articulation, and the aiming articulation to be unlocked;
the upstream pulley of the aiming articulation to be kept locked;
the downstream pulley of the aiming articulation to be unlocked;
the pivoting connection of the aiming articulation to be kept unlocked.

Advantageously, the engagement of the second coupling mode simultaneously causes:
the pivoting connection of the driving articulation to be locked;
the driving pulley to be unlocked relative to the articulation.

Advantageously, the device for locking/unlocking a pivoting connection of an articulation comprises at least one ratchet and a return spigot.

Advantageously, the device for locking the pivoting connection of the driving articulation comprises at least one ratchet, a return spigot and a retaining arm.

Advantageously, the device for locking the pivoting connection of the aiming articulation comprises a locking finger making it possible to release the pulley at a determined angle.

Advantageously, the structural elements comprise yokes and solar generators.

Advantageously, the motor and the driving pulley are placed at the root section.

BRIEF DESCRIPTION OF THE DRAWINGS

Other features and advantages of the invention will appear with the aid of the following description made with respect to the appended drawings which represent.

DETAILED DESCRIPTION

As used herein, the term "structure" in the rest of the description means an articulated arm comprising a plurality of structural elements comprising yokes, solar generators, articulations, a locking/unlocking system and a coupling system.

In the rest of the description, the system that comprises a plurality of locking/unlocking devices positioned at the articulations of the articulated arms is called the locking/unlocking system.

Figure 1:
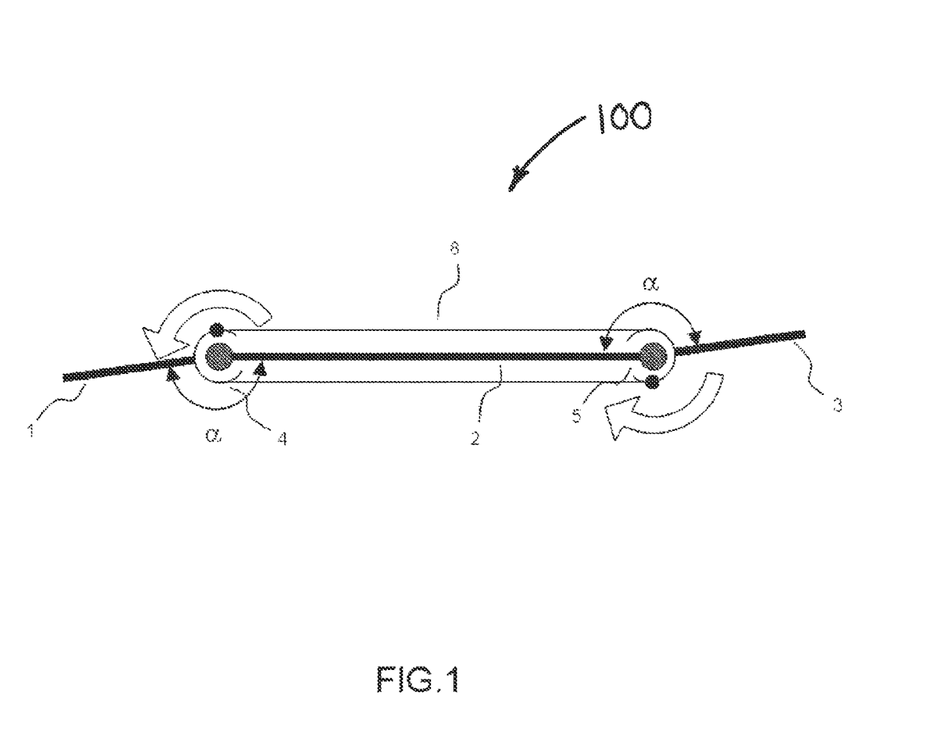
FIG. 1: a coupling system.

FIG. 1 represents a coupling system 100 between three structural elements 1, 2, 3 connected two by two by articulations 4, 5. Each articulation 4, 5 comprises a pivoting connection making it possible to have two structural elements pivot relative to one another. Moreover, the articulations 4, 5 each comprise a pulley. A cable 8 is wound round each of the two pulleys of each articulation 4, 5.

Under the impulsion of a motive force rotating the first pulley, the cable drives the second pulley of the articulation 5.

During the structure-deployment phase, the coupling system 100 allows, under the impulsion of the motive force, a coordinated deployment of the structural elements. The deployment takes place until the structural elements are positioned on the same axis.

The first pulley of the articulation 4 is secured to the pivoting connection of the structural element of this same articulation; the rotation of the first pulley rotates the structural element 2 relative to the structural element 1.

The second pulley is secured to the pivoting connection of the articulation 5 of the structural element 3. The rotation of the second pulley rotates the structural element 3 relative to the structural element 2.

The absolute value of the angle $\alpha$ between the structural element 2 and the structural element 1 in the anticlockwise direction is equal to the absolute value of the angle between the structural element 2 and the structural element 3 in the anticlockwise direction.

The cable 8 operates the pivoting connection of the articulation 5 and causes the structural element 3 to pivot at an identical angle $\alpha$.

The system of coupling by pulleys and by cable reverses the directions of the angles of two consecutive articulations. In the rest of the description this coupling is called the first coupling mode. It corresponds to the coupling of the angles connected together between the various structural elements to deploy the structure. It is used in a first life phase of the satellite which corresponds to the deployment of its arms.

The coupling system 100 of FIG. 1 requires a locking device between the pivoting connection of the articulation 4 of the structural element 1 and the pulley of this same articulation.

When the deployment is complete, a second life phase then begins; it involves the aiming phase which corresponds to another operating mode of the device of the invention. A second coupling mode is then initiated as soon as the locking/unlocking system is engaged after the deployment.

The locking/unlocking device actuates so as to release the pivoting connection of the articulation 4 of the structural element 1 and the pulley of the same articulation. As a result, the pulley does not operate the pivoting connection. The unlocking of the pulley relative to the pivoting connection causes a locking of the pivoting connection connecting the structural element 1 and the structural element 2 which are then fixed relative to one another and the pulley is free.

The rotation of the pulley of the articulation 4 then operates the pulley of the articulation 5. If the pulley of the articulation 5 is connected to the pivoting connection of the articulation 5, the structural element 3 is rotated about the pivoting connection of the articulation 5.

The first life phase between the structural elements is stopped by the locking/unlocking system which breaks the coupling principle of the first phase. The latter locking/unlocking system begins a second life phase which makes it possible to have a structural element 3 pivot about the articulation 5, the rotation being engaged by means of the same motive force as that of the deployment applied to the pivoting connection of the articulation 4.

In this case, the device of the invention with an activatable locking/unlocking system makes it possible to pass from a first life phase of deployment to a second life phase of aiming by using the same motive force during a deployment, the same structural elements and the same coupling elements.

Figure 2:
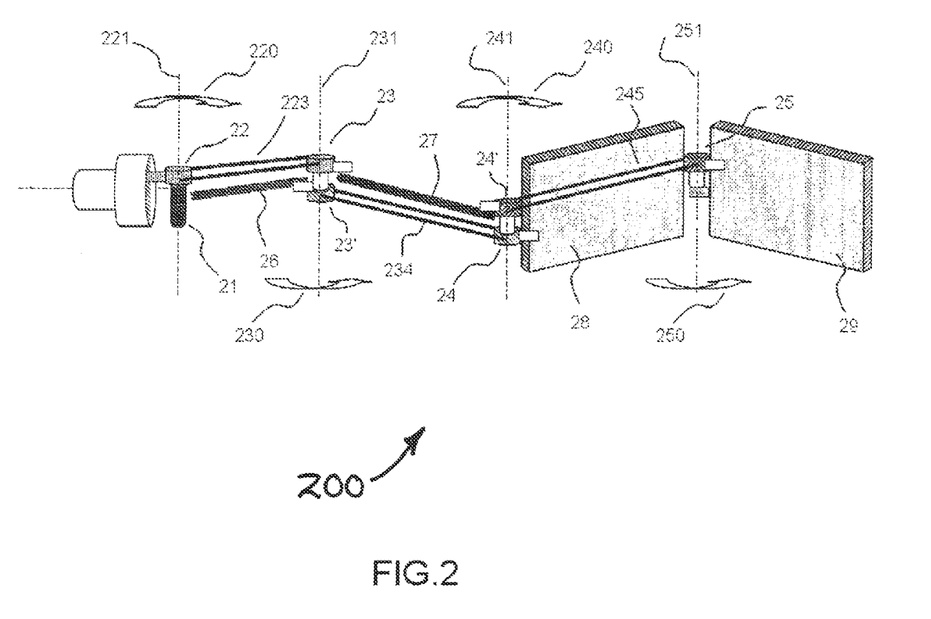
FIG. 2: an articulated structure deployed according to the device of the invention.

FIG. 2 represents a device for deploying and aiming structural elements of a satellite according to the invention.

In one embodiment, so as to share the motor for the various life phases, the device of the invention comprises one of the locking/unlocking devices positioned at the articulations of the arm. On the one hand there are locking/unlocking devices for the pulleys and on the other hand locking/unlocking devices for the pivoting connections making it possible to deploy the whole structure in a first life phase and to aim all or some of the deployed structure in a second life phase which corresponds to the mission of the satellite.

In the first life phase, the structure is initially retracted. It is deployed under the impulsion of the second motor and of the coupling system 100 in its first mode. The pulley 22 is initially secured to the satellite fixed portion. The motor is secured to one side of the pulley 22 and secured to the structural element 26 for the other side. The motor has the same rotation axis 221 as the pivoting connection 31. The motor rotates the structural element 26.

The motor 21 is secured to the pulley 22 except for the reduction gears.

When the motor 21 is running, it makes it possible to rotate the pulley 22 relative to the structural body 26. Since the pulley 22 is secured to the portion attached to the satellite 1, the body 26 is deployed about the axis 221.

The rotation of the pulley 22 relative to the structural element 26 causes, with the aid of the cable 223, the rotation of the pulley 23 which itself rotates the structural element 27 securely connected to the pulley 23.

The rotation of the structural element 26 securely connected to the pulley 23' causes the rotation of the pulley 23. The rotation of the pulley 23' drives the cable 234 which itself drives the pulley 24 securely connected to the structural element 28. The structure 28 is therefore rotated under the impulsion of the rotation of the pulley 24. The rotation of the pulley 24' then rotates under the impulsion of the rotation of the structure 28 and in turn rotates by means of the cable 245 the pulley 25 which is securely connected to the structural element 29 which pivots about the axis 251.

The structural elements 26, 27, 28 and 29, each being secured to a pulley, are deployed by action of the motor in a uniform manner under the stress of the coupling system 100.

Each of the structural elements pivots about the axis of the articulation that separates it from the previous or next structural element.

The structural element 26 pivots about the axis 221, the structural element 27 pivots about the axis 231, the structural element 28 pivots about the axis 241 and the structural element 29 pivots about the axis 251.

The absolute values of the angles of rotation 220, 230, 240 and 250 are equal by virtue of the coupling mechanism in its first mode provided by the pulleys and the cables and the motive force. On the other hand, the angles are in opposite directions in twos. The angle 220 is backwards, the angle 230 is anticlockwise, the angle 240 is clockwise and finally the angle 250 is anticlockwise.

When the deployment is complete, the first life phase is complete. Once the structural elements are deployed, they are in the same axis. The angles between each structural element is 180° in the example of FIG. 2.

The invention comprises locking/unlocking devices at the articulations making it possible to lock a portion of the articulations when the deployment is complete, thus closing the first life phase of the satellite. The second motor is also used for the second life phase.

In each articulation, the pulley and the pivoting connection can be independently locked or unlocked. One embodiment of the invention makes it possible to link the locking of a pulley in rotation to the unlocking of a pivoting connection.

Several variant embodiments are possible depending on the mission and depending on which portion of the structure it is desired to cause to pivot towards a target.

This involves configuring the locking/unlocking system so that one articulation unlocks its pivoting connection which will be operated by the force of the second motor. The locking/unlocking system therefore allows a second coupling mode in which a rotation of the pulley allows the rotation of a predefined pivoting connection.

The second motor 21 makes it possible to pivot the structure comprising a plurality of structural elements about an axis 221, or about an axis 231 or else about an axis 241 when it is necessary to orient a portion of the structure 200 and in particular the solar generators 28 and 29 towards a designated target. The invention makes it possible to have a locking/unlocking system making it possible to pivot a portion, situated at the end of the structure, not necessarily at the root section 300 but at an articulation distant from the payload. This configuration makes it possible for example to get away from the shadow of the satellite which could cover the solar generators. Another example makes it possible to limit the specific inertia variations associated with the aiming of the solar generators.

FIGS. 3A, 3B, 3C and 3D represent various possible aiming configurations depending on the configuration of the locking/unlocking system.

Figure 3A:
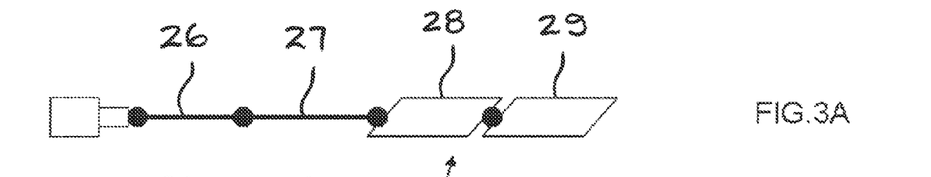
FIGS. 3A, 3B, 3C, 3D: the structure according to the device of the invention in its life phase of aiming according to various locking modes.

FIG. 3A represents the structure when it is fully deployed; it is then ready to begin its second life phase.

Figures 3B, 3C, 3D:
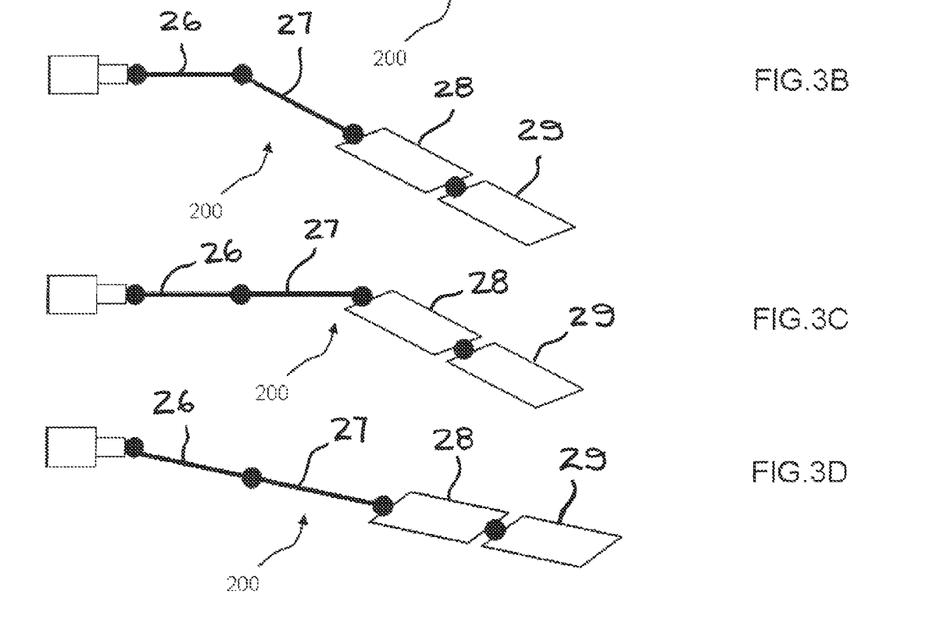

FIG. 3B represents the structure when it aims at a target; the pivoting occurs between the first and the second yoke.

FIG. 3C represents the structure when it aims at a target; the pivoting occurs between the second yoke and the first solar generator.

FIG. 3D represents the structure when it points at a target; the pivoting occurs at the root section 300 between the payload of the satellite and the first yoke.

The locking/unlocking system may comprise several application modes depending on the variant embodiments and depending on the position of the locking/unlocking devices at the articulations.

In a first variant embodiment, as shown in FIG. 3C, a locking/unlocking device unlocks the pulley with the articulation of the root section 300 while locking its pivoting connection. The motor remains secured to the pulley and separates from the pivoting connection with the structural element 26. The motor no longer rotates the structural element 26, which is now fixed, but only the pulley 22 (see FIG. 2).

As best shown in FIG. 2, the motor 21 operates the pulley 22. By pivoting, the pulley 22 actuates the cable 223 around the pulley 23 which itself starts to rotate.

At the second articulation 232, there are two pulleys:
a first pulley 23 at a first end of the articulation 232 connected to the pulley 22 via the cable 223 and;
a second pulley 23' situated at the other end of the articulation 232.

In this first variant of this first mode, a locking/unlocking device makes it possible to lock the articulation 232 while unlocking the pulleys 23 and 23' of the articulation. In this case, following the deployment, the connection between the element 26 and the element 27 is a fixed connection. There is therefore no more pivoting of this articulation.

The rotation of the pulley 23 rotates the pulley 23' about the axis 231. The cable 234 in turn rotates the pulley 24 which is unlocked from the pulley 24'. The pulley 24' is connected to the pivoting connection of the structural element 28.

The two solar generators 28, 29 are secured together following the deployment of the structure, the pivoting connection connecting the structural elements 28 and 29 being locked.

The structural element 28 is therefore engaged in rotation about the axis 241. The structure then consisting of the two solar generators 28 and 29 and the pulley 25 pivots under the action of the motor.

As shown in FIG. 3B, a second variant of this first mode is to activate a locking/unlocking device which makes it possible, at the end of the deployment life phase, to unlock the pulley 23' of the articulation 232 without locking the articulation. In this variant, the rotation of the motor 21 will therefore have the effect of turning only the articulation 232 about its axis 231 by means of the pulley 22, the coupling 223 and the pulley 23. Following the deployment, the elements 27, 28 and 29 are fixedly connected by the locking/unlocking device which has removed the pivoting connections between the structural elements.

As shown in FIG. 3D, a third variant is not engaging the unlocking at the root section 300 between the pivoting connection of the structural element 26 and the motor. This makes it possible to actuate the pivoting of the structure simply by acting on the motor, the structural elements 26, 27, 28 and 29 being in this instance connected via connections that are fixed together. The structure then pivots about the axis 221 and corresponds to the situation in FIG. 3D.

In a fourth variant embodiment, the device, once deployed, makes it possible to activate the locking of the articulation 232 and 233 and to unlock the pulleys 23, 23', 24 and 24'. In this case, following the deployment, the connection between the element 26 and the element 27 is fixed and the connection between the elements 27 and 28 is fixed. There is therefore no longer any pivoting of these articulations.

The rotation of the motor 21 rotates the pulley 22 which rotates the pulley 23 via the coupling 223.

The rotation of the pulley 23 rotates the pulley 23' about the axis 231. The cable 234 in turn rotates the pulley 24 rotates the pulley 24'. The rotation of the pulley 24' operates the cable 245 which in turn operates the pulley 25. The pulley 25, in this variant, is secured to the pivoting connection belonging to the structural element 29.

In consequence, the panel 29 is rotated under the impulsion of the motor.

The two solar generators 28, 29 are then no longer in the same plane. This situation is not used very much operationally, but the invention allows all the possible configurations depending on the configuration of the locking/unlocking devices of the pulleys and of the pivoting connections.

The structural element 29 is therefore engaged in rotation about the axis 251. The structure, then consisting of a single solar generator 29, pivots under the action of the motor.

Other combinations of these variants are also possible according to the same operating principle of locking/unlocking.

Figure 4:
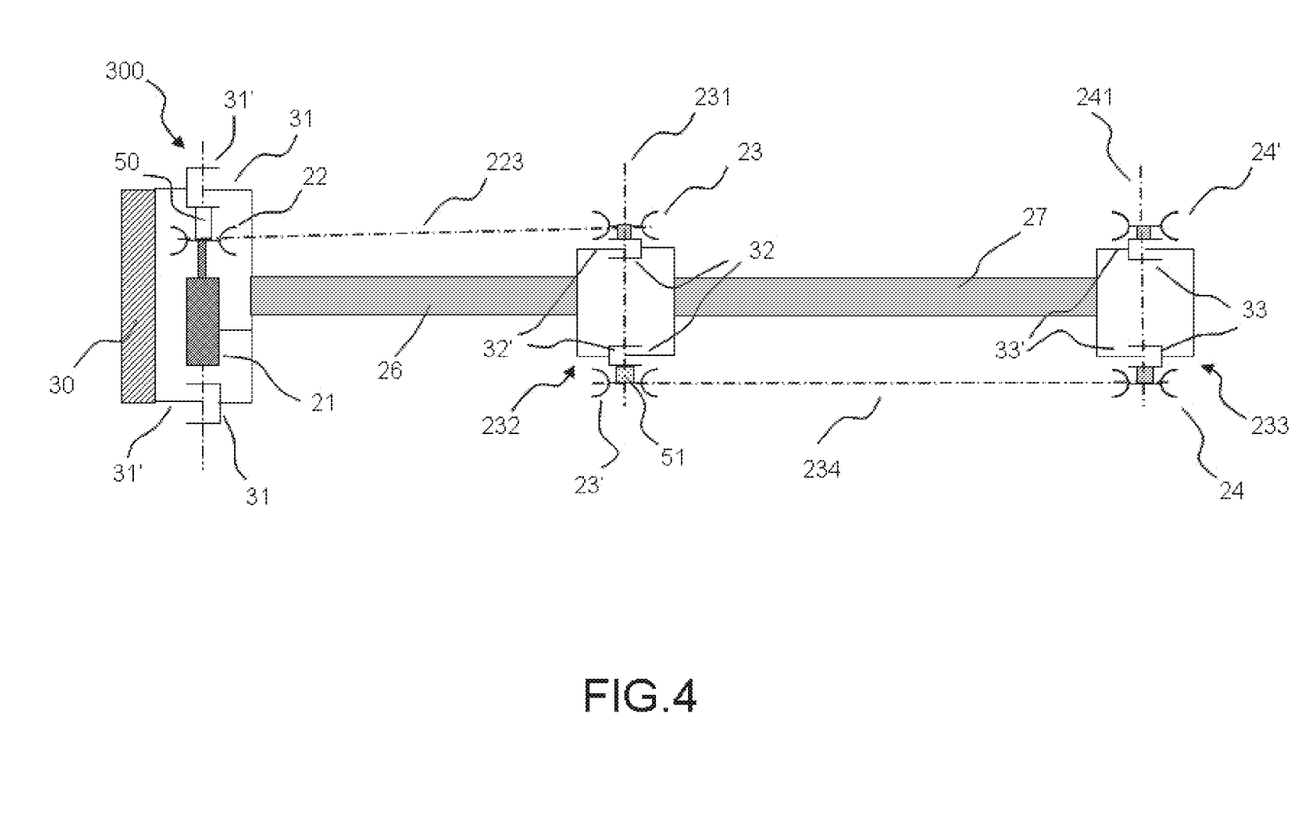
FIG. 4: a device for locking/unlocking the articulations and for coupling motor functions of the invention.

FIG. 4 represents in detail the mechanism of the second coupling and locking mode according to the invention.

The pulley 22 in rotation driven by the driving means 21 makes it possible to pivot the pulley 23.

Several variants expressed in FIGS. 3A, 3B, 3C and 3D of the invention make it possible to aim the structure along a preferred axis.

One particular embodiment of the invention makes it possible to lock the pivoting connection 31 and 31' following the deployment phase of the structure. The locking of the connection 31, 31' secures the payload of the satellite 30 to the structural element 26. The pivoting connection 31, 31' is therefore a fixed connection.

The motor 21 then drives only the pulley 22.

The invention makes it possible simultaneously to lock the pivoting connection 31, 31' while unlocking the pulley 22 with respect to the articulation by a locking/unlocking device 50. The pulley 22 pivots without causing the pivoting connection of the articulation to pivot.

Since the structural element 26 is then fixed relative to the payload 30, the pulley 23' must be released from the structural element 26 in order to allow the rotation about the axis 231 without driving the coupling 234. This function is performed by the locking/unlocking device 51.

In this situation, the cable 223 drives the pulley 23 secured to the articulation and to the pivoting connection 32. The structural element 27 then pivots about the axis 231. This configuration makes it possible to articulate the structure comprising the elements 27 and following after the articulation 32, 32'.

In this embodiment, the structure therefore pivots about the axis 231

The following articulations, notably the articulation 33, 33' are locked in this embodiment. This configuration makes it possible to orient the structure so as to aim it at a desired target.

In another embodiment, a locking/unlocking device can be activated at the articulations 32 and 32 which then form a fixed connection. In this case, by keeping the locking configuration of the articulation at the root section 300, the invention makes it possible to pivot the structure at the articulation 33, 33. The unlocking of the pulley 22 at the root section 300 causes the unlocking of the pivoting connection 33, 33'.

In one embodiment, a locking/unlocking device can be produced from a cam and a locking finger.

One advantage of the invention is that it allows the use of a single motor and of a single coupling for the life phase corresponding to the deployment and the life phase corresponding to the aiming of the structure.

One advantage of this solution is that it minimizes the costs, lightens the device of the invention and more particularly the satellite.

One advantage is also the simplicity of application and the possibility of configuring the locking/unlocking system with respect to the mission of the satellite.

Finally another advantage is the robustness of the system; by sharing the driving means, the risks of failures are reduced.

Figure 5:
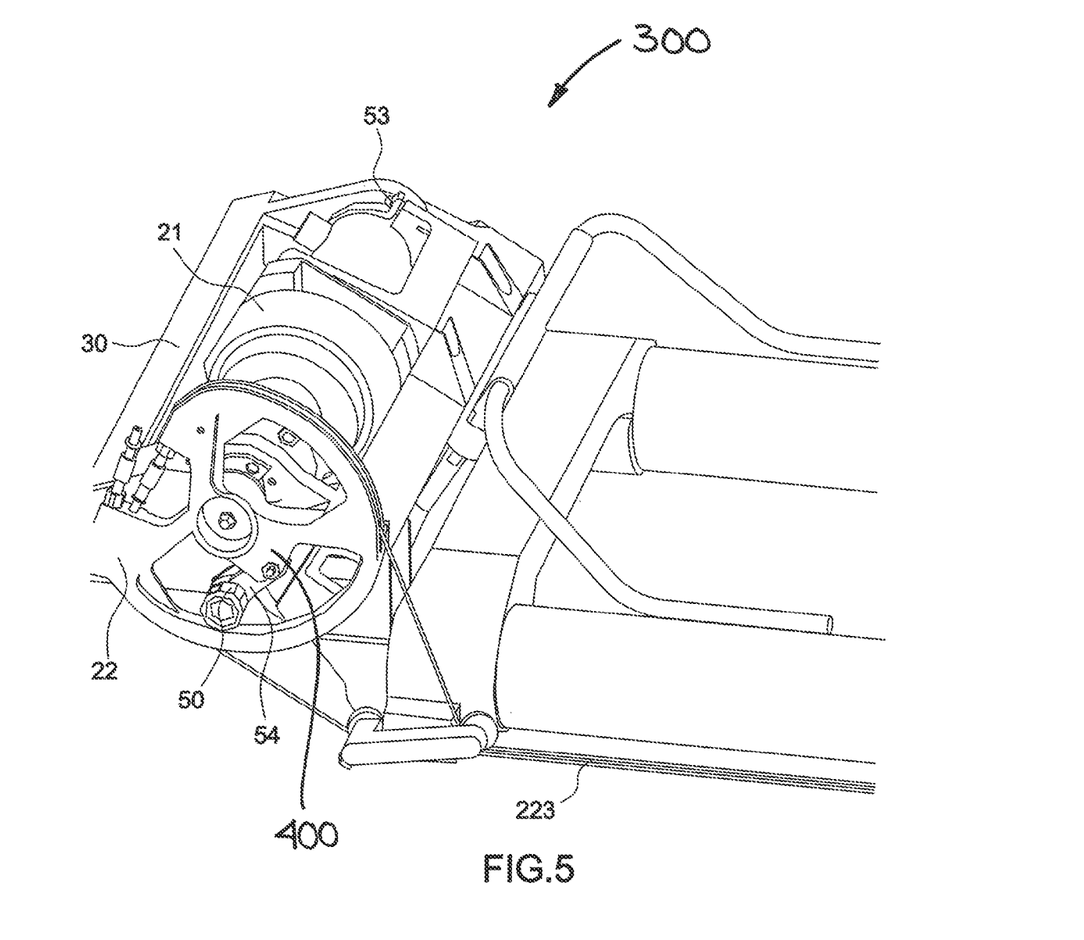
FIG. 5: a first 3D view of an articulation at the root section of a satellite arm according to the invention.

FIG. 5 represents a 3D view of an articulation at the root section 300 of a deployable arm of a satellite according to the invention.

A root section 300 is used to make the connection with the satellite. A first locking device 53 at a first portion of the root section 300 makes it possible to create a fixed connection with the satellite portion 30. A second portion of the root section 300 is situated on the other side of the articulation, on the same side as the pulley 22 which drives the cables 223.

In the example of FIG. 5, the second portion of the root section 300 comprises a locking/unlocking system 50 that can be actuated from a retaining arm 54 which fits into the central portion 400 of the pulley 22. The locking/unlocking system 50 allows the locking of the articulation and the unlocking of the pulley 22 after the first life phase.

The retaining arm 54 of the pulley 22 is secured to the spindle of a ratchet 61 (see FIG. 6) for locking the articulation, the latter not being shown in FIG. 5.

When the ratchet 61 (see FIG. 6) locks the articulation by turning on its spindle, it makes it possible to rotate the retaining arm 54 of the pulley. Consequently, it makes it possible to release the pulley 22 from the articulation.

Figure 6:
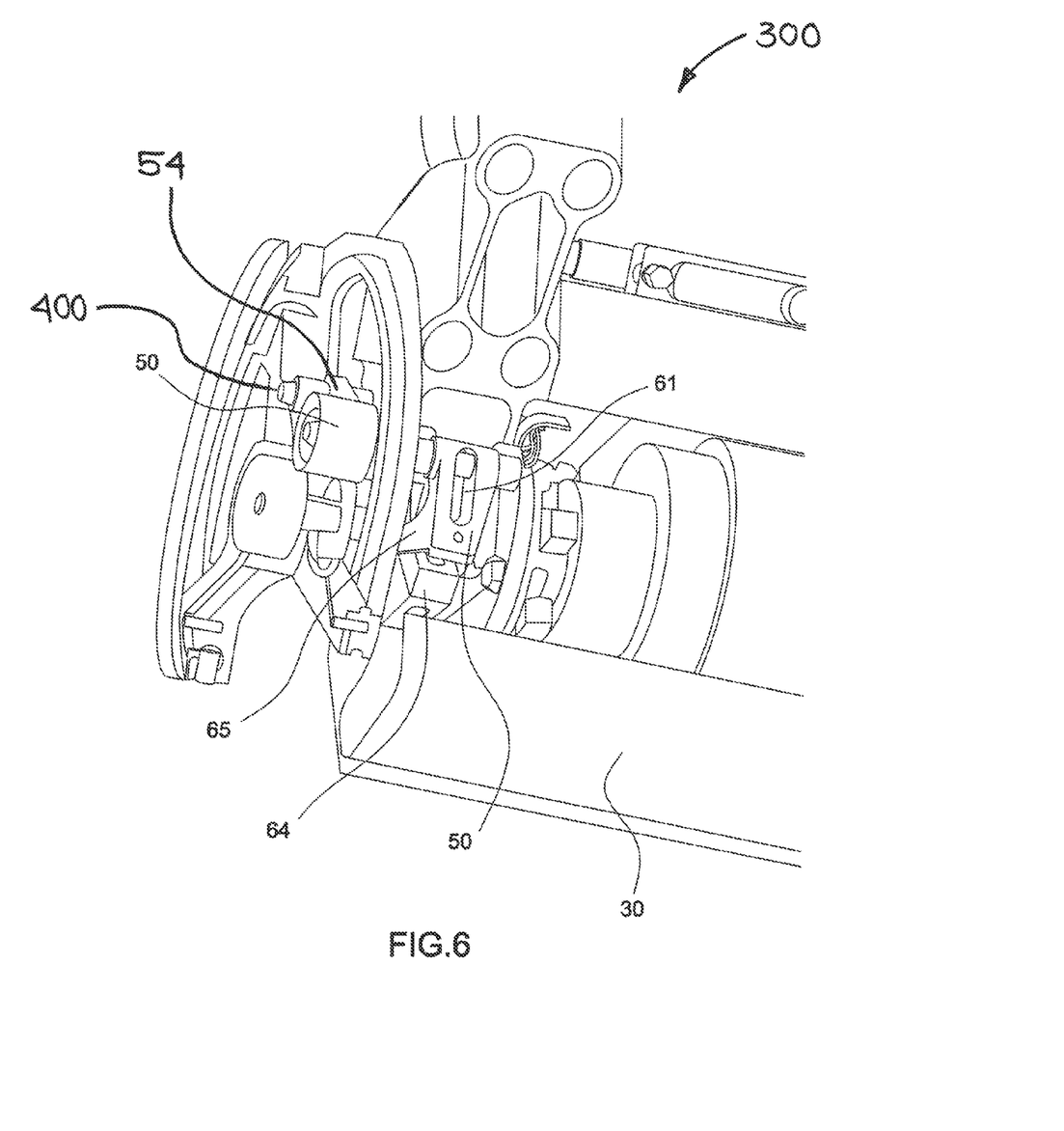
FIG. 6: a second 3D view of an articulation at the root section of a satellite arm according to the invention.

FIG. 6 represents another 3D view of the same articulation of FIG. 5. The locking/unlocking system 50 comprises a locking finger 65 and a ratchet 61.

In this view, the fixed portion 30 of the satellite is situated underneath in FIG. 6.

When the ratchet 61 turns about its spindle, it places itself in opposition to the movement of a return spigot 64 of the movable portion of the articulation. The ratchet 61 makes it possible therefore to lock the articulation and by turning, it simultaneously releases the pulley 22.

One advantage is that the locking of the articulation and the unlocking of the pulley take place simultaneously.

Figure 7:
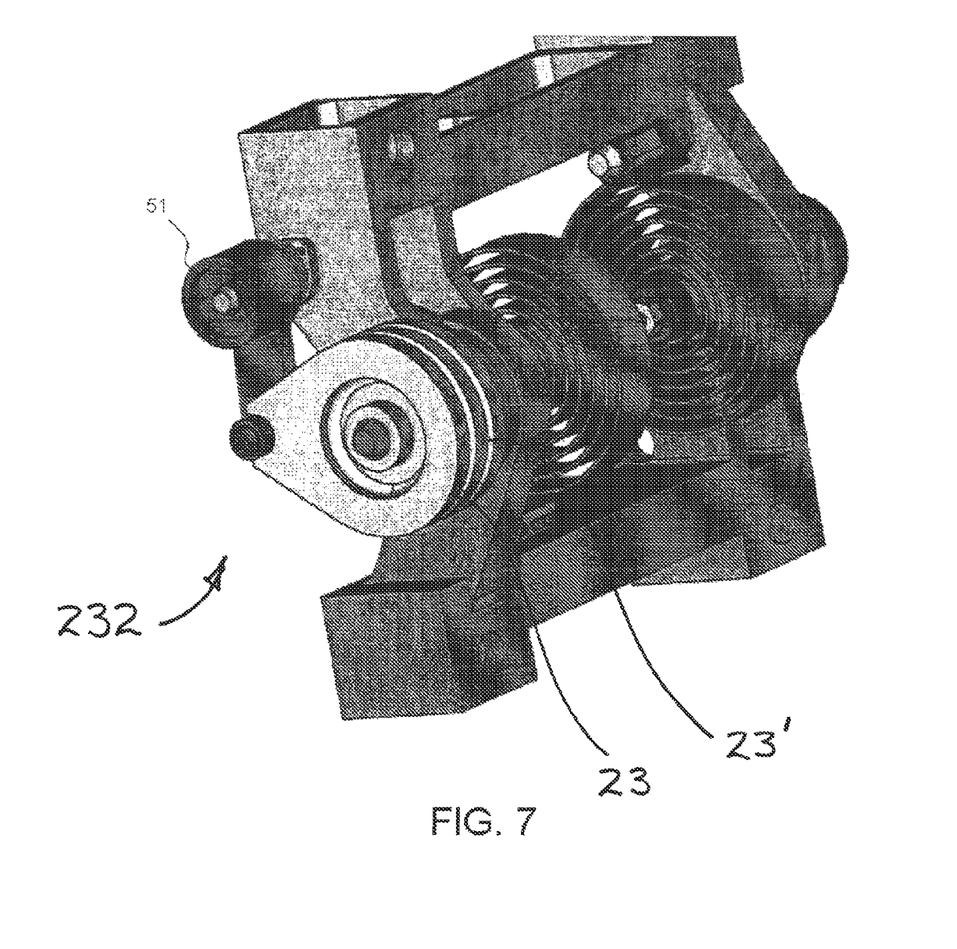
FIG. 7: a 3D view of an aiming articulation of a satellite arm according to the invention.

FIG. 7 represents the articulation 232 which joins two structural elements to the arm of the satellite. This articulation is also called an aiming articulation. The locking/unlocking system 51 makes it possible to unlock the pulley relative to the articulation. This configuration allows the structural portion 27 to be aimed from the coupling 234 (as shown in FIG. 4).

The invention claimed is:

1. A device for deploying and aiming structural elements designed to be placed in Earth orbit, comprising:
   an articulated arm linked to a payload of a space satellite via a root section, the articulated arm including an assembly of a plurality of structural elements linked together by articulations;
   the articulations including at least one pivoting connection whereby two consecutive structural elements pivot relative to one another;
   the root section including a pivoting connection that enables a first structural element to pivot relative to the payload;
   a locking/unlocking system including at least one locking device located on at least one of the articulations, such that the at least one locking device may lock the at least one pivoting connection;
   a coupling system coupled to at least two of the articulations, the coupling system causing each of the plurality of structural elements to pivot according to a predefined law of rotation when operated in a first coupling mode; and
   a motor to activate the coupling system, the motor being positioned on an articulation, called a driving articulation,
   wherein the locking/unlocking system is operable to deactivate the first coupling mode and to activate a second coupling mode, the second coupling mode retaining an unlocking of a pivoting connection of one of the articulations, called an aiming articulation, a rotation of the motor causing a rotation of the aiming articulation.

2. The device for deploying and aiming structural elements designed to be placed in Earth orbit according to claim 1, wherein the coupling system further includes:
   a plurality of pulleys linked by cables, one of the plurality of pulleys being activated by the motor, called a driving pulley; and
   means for attaching the plurality of pulleys to the plurality of structural elements, each of the articulations comprising at least two pulleys one of which is attached to an upstream structural element, called an upstream pulley, and the other is attached to a downstream structural element, called a downstream pulley, the root section including a pulley attached to the first structural element.

3. The device for deploying and aiming structural elements designed to be placed in Earth orbit according to claim 1, wherein the locking/unlocking system includes at least one device for locking/unlocking a coupling pulley relative to a corresponding one of the articulations.

4. The device for deploying and aiming structural elements designed to be placed in Earth orbit according to claim 3, wherein an articulation including the motor, and all the articulations situated between the articulation including the motor and the aiming articulation comprise a device for locking/unlocking a pulley, the aiming articulation comprising a device for locking/unlocking pulley only on the downstream pulley.

5. The device for deploying and aiming structural elements designed to be placed in Earth orbit according to claim 3, wherein all the articulations have a device for locking/unlocking a pivoting connection of an articulation except the aiming articulation.

6. The device for deploying and aiming structural elements designed to be placed in Earth orbit according to claim 5, wherein the engagement of the second coupling mode causes:
   a plurality of pivoting connections to be locked;
   the pulleys of each articulation included between the articulation comprising the motor, called the driving articulation, and the aiming articulation to be unlocked;
   the upstream pulley of the aiming articulation to be kept locked;
   the downstream pulley of the aiming articulation to be unlocked;

the pivoting connection of the aiming articulation to be kept unlocked.

7. The device for deploying and aiming structural elements designed to be placed in Earth orbit according to claim 6, wherein the engagement of the second coupling mode simultaneously causes:
the pivoting connection of the driving articulation to be locked;
the driving pulley to be unlocked relative to the articulation.

8. The device for deploying and aiming structural elements designed to be placed in Earth orbit according to claim 3, wherein the device for locking/unlocking a pivoting connection of an articulation further comprises at least one ratchet and a return spigot.

9. The device for deploying and aiming structural elements designed to be placed in Earth orbit according to claim 3, wherein the device for locking the pivoting connection of the driving articulation further comprises at least one ratchet, a return spigot, and a retaining arm.

10. The device for deploying and aiming structural elements designed to be placed in Earth orbit according to claim 3, wherein the device for locking the pivoting connection of the aiming articulation further comprises a locking finger operable to release the pulley at a determined angle.

11. The device for deploying and aiming structural elements designed to be placed in Earth orbit according to claim 10, wherein the structural elements further comprise yokes and solar generators.

12. The device for deploying and aiming structural elements designed to be placed in Earth orbit according to claim 1, wherein the structural elements comprise yokes and solar generators.

13. The device for deploying and aiming structural elements designed to be placed in Earth orbit according to claim 1, wherein the motor and the driving pulley are placed at the root section.

14. The device for deploying and aiming structural elements designed to be placed in Earth orbit according to claim 1, wherein the at least one locking device is located on an articulation other than the aiming articulation.

* * * * *